Oct. 12, 1965     N. R. ROBBINS ETAL     3,211,895
RECORD SENSING MECHANISM
Filed June 12, 1961     6 Sheets-Sheet 1

INVENTORS.
NEAL R. ROBBINS.
WILLIAM E. DELL.
BY
Harry R. Dumont
ATTORNEY.

INVENTORS.
NEAL R. ROBBINS.
WILLIAM E. DELL

BY Harry R Dumont

ATTORNEY.

Oct. 12, 1965 N. R. ROBBINS ETAL 3,211,895
RECORD SENSING MECHANISM
Filed June 12, 1961 6 Sheets-Sheet 6

INVENTORS.
NEAL R. ROBBINS.
WILLIAM E. DELL.

United States Patent Office 3,211,895
Patented Oct. 12, 1965

3,211,895
RECORD SENSING MECHANISM
Neal R. Robbins, Ypsilanti, and William E. Dell, Livonia, Mich., assignors to Burroughs Corporation, Detroit, Mich., a corporation of Michigan
Filed June 12, 1961, Ser. No. 116,433
3 Claims. (Cl. 235—61.11)

This invention relates generally to a document feeding apparatus and, more particularly, to a perforated record sensing mechanism therefor.

It is an object of this invention to provide an improved perforated record sensing mechanism selectively actuated to provide a constant yielding pressure against a record sheet in transport.

It is a further object of this invention to provide a yieldable slit perforation sensing mechanism with a direct force actuation means having a slit spreading portion serving to sense and open a spreadable slit in preparation for a subsequent sheet feeder arresting operation to position an incised sheet at a line corresponding to a sensed incision thereon.

It is a still further object of this invention to provide a sensing mechanism which senses the presence of a blank record in response to the passage of its trailing edge in a manner which affords the least possible resistance to the movement of the record.

The foregoing and other objects of the present invention will be apparent from the detailed description of a preferred embodiment thereof described hereinafter. In the accompanying drawings.

The preferred embodiment of the invention is shown in connection with a bookkeeping machine of the type shown and described in U.S. Patent 2,629,549 "Automatic Function Control Mechanism for Accounting Machines" issued to T. M. Butler on February 24, 1953. The machine may be described as a key-set, electric motor-driven, full keyboard machine with a traveling paper carriage and both manual and automatic control of machine functions. The area of the bookkeeping machine most closely related to the present invention is a supporting means or paper carriage which is of the front feed type. The carriage supports a platen which is movable from its printing position to a retracted or front feed position and reversely. The opening and closing of the carriage, that is, the movements of the platen from front feed to printing position are effected by power derived from the bookkeeping machine drive motor. The control of the opening and closing of the carriage can be effected automatically during machine operation as well as manually.

Figures 1, 1A:
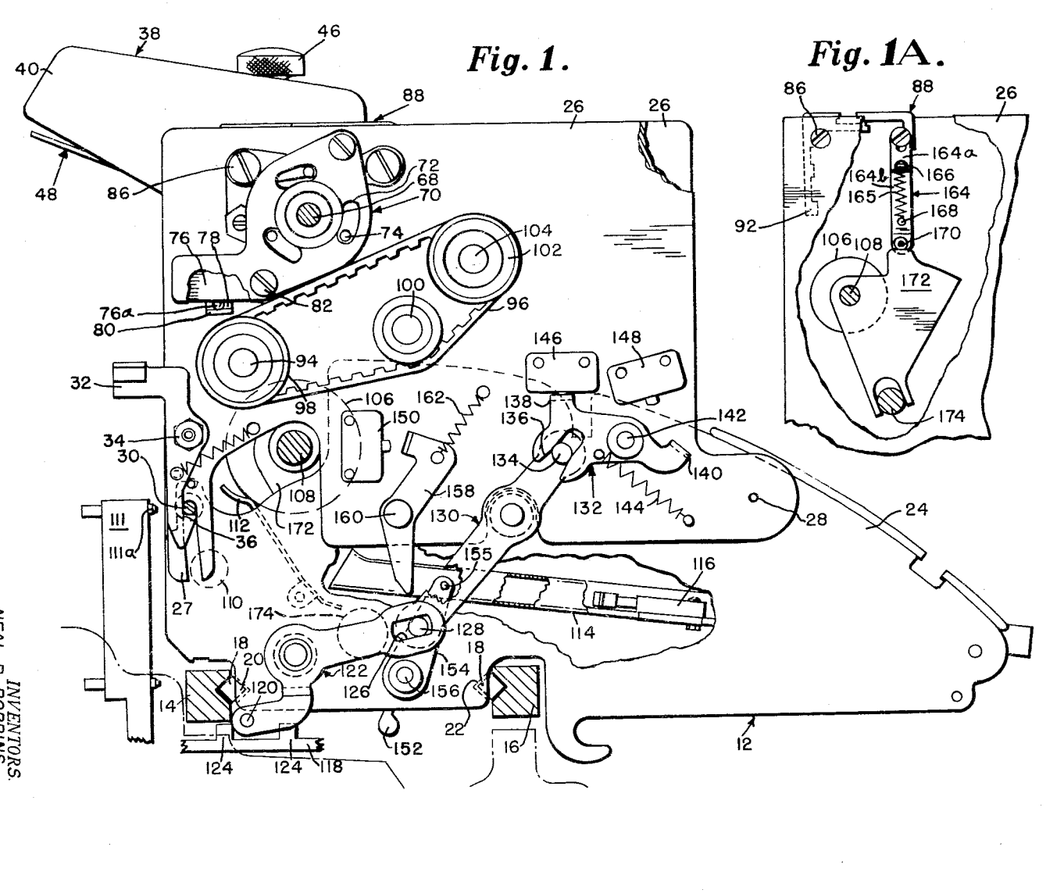
FIG. 1 is a right side elevation of the front feed apparatus as mounted on the carriage of a bookkeeping machine.
FIG. 1A is a view with a portion of the side frame broken away, showing the means for inhibiting the drive means for the front feed apparatus.

FIG. 1 shows a right side view of the movable carriage 12, which is laterally displaceable along a front rail 14 and a rear rail 16. Rolling support for the carriage is afforded by two lines of roller bearings 18 seated in opposing V-shaped grooves in front rail 14 and the carriage race rail 20 and rear rail 16 and carriage race rail 22, respectively.

The carriage 12 has a spaced pair of lower side frames 24, one of which is shown, and a spaced pair of upper side frames 26 pivotally mounted about their rearward lower corners on a stud 28 fixed to each of the side frames 24. Right hand side frame 26 terminates at its forward lower corner in a downwardly extending forked projection 27. A latch is provided for holding the side frame 26 in a secured position which includes a stud 30 mounted on stationary side frame 24 and a lever 32 pivotally mounted on stud 34 on side frame 26. A lateral extension 36 on the lower end of lever 32 is engageable with stud 30 to hold the pivotal side frame 26 in a locked position.

Figure 8:
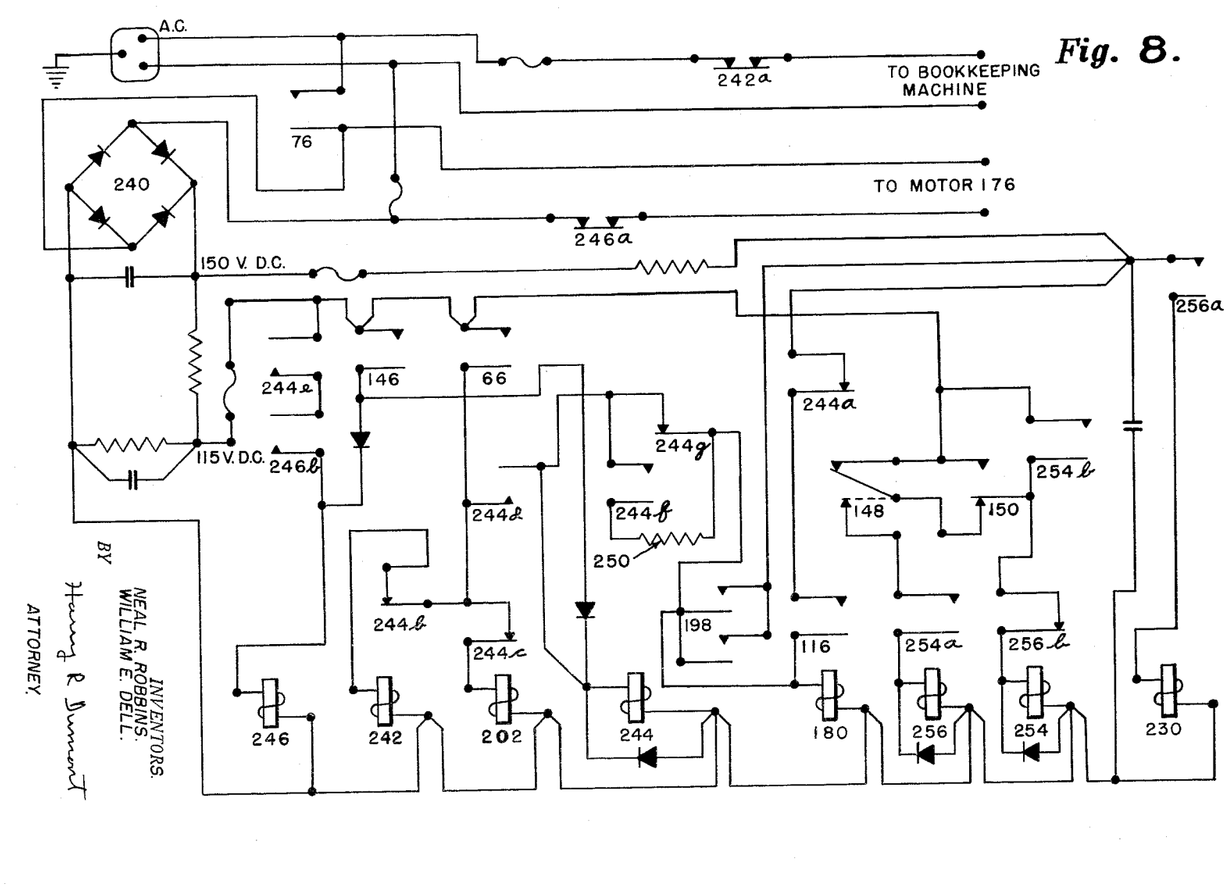
FIG. 8 is a circuit diagram of the electrical control system for the front feed apparatus.

The guideway for feeding of a record is mounted on the carriage 12 and indicated generally by the numeral 38. The guideway includes a pair of oppositely disposed, spaced apart guide members preferably having laterally spaced side members 40. A pair of lock nuts 46, one of which is shown, are utilized to lock the side members 40 of the guideway in various laterally spaced positions across the top of the carriage to accommodate record documents of varying widths as will be seen more clearly in connection with FIG. 2 hereinafter. The upper portion of a pivotable lever 48 associated with the guideway is shown and its function and operation will be shown and explained in connection with FIG. 3. Mounted on the outside surface of side frame 26 on a manually rotatable shaft 68 is a plate 70. Plate 70 has formed therein three arcuate slots 72 engaging three studs 74 on plate 26. An "on-off" switch 76, which is diagrammatically shown hereinafter in FIG. 8 is mounted on the outside of said frame 26 and the plunger 76a therefor is shown. Clockwise rotation of shaft 68 will pivot switch actuating lever 78 to engage the plunger 76a with lug 80 and enable the operation of the front feed apparatus. Stud 86 is mounted on side frame 26 and forms the pivot point for a rockable frame 88. Also shown in FIG. 1 is a portion of the drive mechanism for a sheet feed means or drive roll 94 which mechanism includes toothed belt 96, idler pulleys 98 and 100 and driving pulley 102 carried by drive shaft 104. It should be noted that in FIG. 1 the front feed apparatus is maintained in the condition of feeding a document into the carriage with the carriage in an open position as explained below.

The lower portion of the drawing in FIG. 1 shows mechanism associated with the opening and closing of the carriage and is extensively similar to the apparatus disclosed in the aforementioned Butler patent in FIGS. 102 and 103 thereof. The basic parts of the carriage operating mechanism include a movable record feeding platen 106 mounted on shaft 108 extending transversely across the machine between side plates 26 and movable rearwardly and forwardly in the machine to open the carriage to permit insertion or removal of a document or to secure the document in a print position. When the platen 106 is moved forwardly to its closed position, it limits against pressure roll 110 which is maintained rotatively in a fixed position in the machine. The level of the print position is indicated by the upper printing element 111a on type bar 111 shown in a raised or active position. A resilient form guide member 112 is mounted interior of side frame 24 and serves to guide an entering record in a path around the periphery of platen 106 and toward the lower end portion 114 of the record guideway. Mounted inside and at the end of the guideway end portion 114 is a lower limit switch 116 and the actuating arm therefor. Rearward movement of slide 118, shown in part, which corresponds to slide 1638 of the Butler patent as shown in FIG. 102 thereof, initiates the closing of the carriage and the forward movement of platen 106. Bail 120 which corresponds to bail 1096 of the Butler patent is carried at the forward end of lever 122 and is moved rearwardly between upstanding lugs 124 on slide 118. The rearward end of lever 122 has a slot 126 which engages a stud 128 mounted on a lever 130. As shown in the drawing, lever 130 is pivotally mounted on the outer surface of side frame 24. Thus as lever 122 is rocked about its center, the action of slot 126 on stud 128 will rock lever 130 in a clockwise direction. A switch actuating member 132 is coupled by a pin and slot connection indicated by numerals 134 and 136 to the upper end of lever 130. Switch actuating member 132 further has two projections 138 and 140 is pivotally mounted on stud 142 on side frame 26 and biased counterclockwise by spring 144. Fixed to the outside of side frame 26 are carriage open control means or switch 146 and carriage closed control means or switch 148, which are adapted to be actuated by member 132 according to the open or closed position of the carriage.

Also mounted on the outside of side frame 26 is a spacing switch 150 operable to be actuated during the line spacing operation of the bookkeeping machine in a manner best shown in FIG. 103 of the Butler patent and explained in connection therewith. A line spacing bail 152 which corresponds to bail 1247 of the Butler patent is moved rearwardly in the machine with each vertical line space operation whereby the lever 154 coupled thereto and carrying a stud 155 at its upper end is rocked counterclockwise about stud 156 on side frame 24. A switch actuator 158 is mounted pivotally on stud 160 on side frame 26 and biased in a generally upward position by spring 162. The counterclockwise rotation of lever 154 strikes the lower arm of switch actuator 158, rocking it clockwise against the tension of spring 162. On the return clockwise movement of lever 54 and at the completion of the spacing operation, the stud 155 of lever 154 drives lever 158 counterclockwise to actuate spacing switch 150.

FIG. 1A shows a portion of side frame 26 broken away to best illustrate the manner in which platen 106 on shaft 108 is moved between an open or ineffective position and closed or effective position. The frame 88, which is an integral part of the structure of the guideway 38, is normally pivotable in a clockwise direction about stud 86. The rearward portion of frame 88 has a compressible arm 164 depending therefrom. Arm 164 comprises a lower member 164b and an upper member 164a slidably mounted thereon. A compression spring 165 is mounted between a stud 166 on upper member 164a and a stud 168 on lower member 164b. A roller 170 is mounted on the end of arm 164 and in yieldable engagement with the upper cam outline of an actuator or cam plate 172. It should be noted that platen shaft 108 is carried by cam plate 172 and by a like cam at the other side of the Butler machine. The cam plate 172 is rockably mounted on transverse shaft 174 which extends between said frames 26 and is rocked in a counterclockwise direction during each carriage closing and opening cycle of operation of the bookkeeping machine. Cam plate 172 which is connected to lever 130 by a linkage not shown is moved by lever 130 counterclockwise with the closure of the carriage. Thus, roller 170 of arm 164 drops to the lower cam surface of cam plate 172 whereby frame 88 is permitted to rock in a clockwise direction. The rocking motion of frame 88 is utilized to interrupt the drive of the front feed apparatus in a manner which will be explained in connection with FIG. 3 hereinafter.

Figure 2:
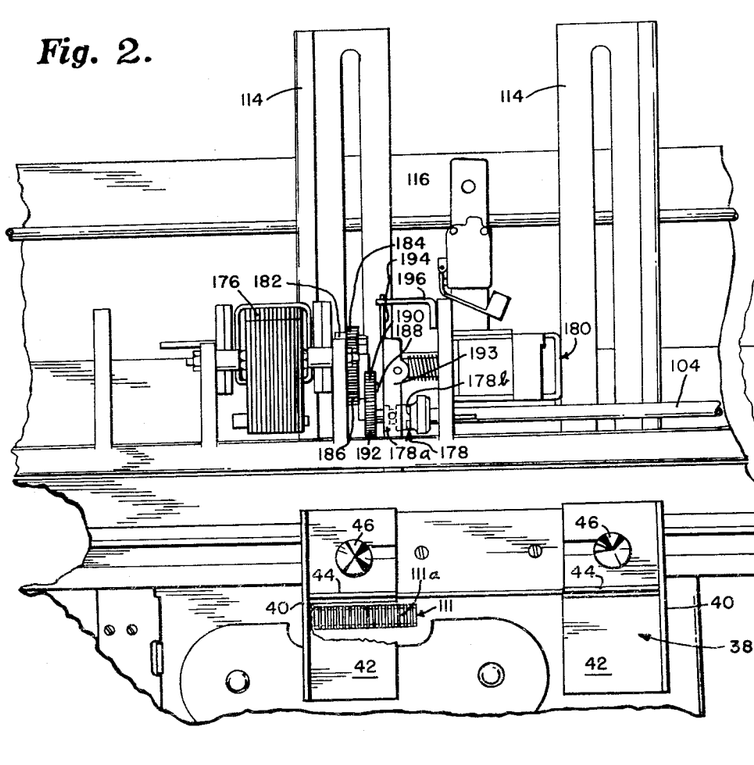
FIG. 2 is a top plan view of the bookkeeping machine and the drive mechanism for the front feed apparatus.

FIG. 2 shows the drive mechanism associated with the front feed apparatus and includes as its main components an electrical motor 176, an intermediate gear train, a clutch 178 and a brake solenoid 180, all of which are mounted on the carriage 12. It is the function of the brake solenoid 180 to interrupt the drive to the drive roll 94 of the front feed mechanism when a perforation is sensed in the record fed to locate the record in the proper position for the next operation of the bookkeeping machine. Motor 176 has a drive shaft 182 which carries a pinion gear 184 and is rotated in a counterclockwise direction. Gear 184 meshes with gear 186 mounted on shaft 188 to drive the shaft in a clockwise direction. Also mounted on shaft 188 is a gear 190 which is meshed with a gear 192 fixed to drive shaft 104 previously mentioned herein. Clutch 178 is of a type well known in the art and has two interengageable members 178a and 178b. Clutch member 178a is of a male type configuration and is affixed to gear 192 to rotate therewith. Driven clutch member 178b is of a female type configuration, is coupled to rotate with shaft 104, and is slidably movable on shaft 104 into or away from engagement with member 178a to selectively couple or uncouple the drive of motor 176 to shaft 104. During the operation of the front feed apparatus, the drive is continuously applied to drive roll 94 until sensing of a perforation occurs or the trailing edge of an unpunched record has passed the sensing member. Responsive to either of these conditions the drive will be interrupted or inhibited by the activation of brake solenoid 180. Brake solenoid 180 is a plunger type solenoid. Clutch actuating arm 193 is coupled at one end to clutch member 178b, is coupled near its center to the plunger of the solenoid 180 and is pivotably retained about its end portion 194 by a bracket plate 196. Energization of solenoid 180 causes the rightward movement of its plunger to pivot clutch actuating arm 193 and withdraw clutch member 178b from engagement with clutch member 178a to interrupt the normal drive to shaft 104 and effectively stop the record.

FIG. 2 also shows additional detail of the guideway 38 comprising a pair of inclined front plates 42, each mounted on its respective side member 40, and rear plate 44 which is in a vertically upstanding position.

Figure 2A:
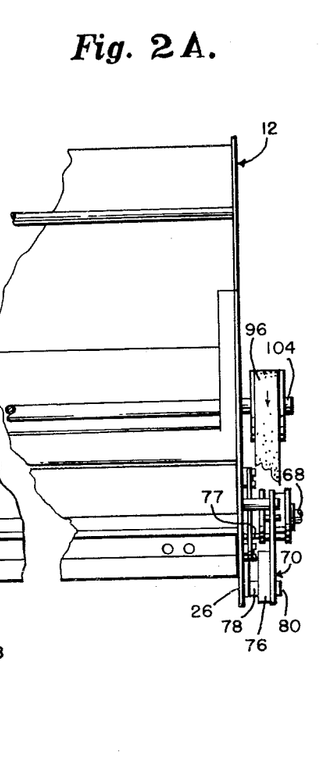
FIG. 2A is a plan view showing the front feed apparatus enabling mechanism.

FIG. 2A illustrates the manner in which the manual rotation of shaft 68 and of plate 70 mounted thereon enables the front feed apparatus for operation. Stud 77 is fastened to plate 70 by screw fastener 82 as shown in FIG. 1. Stud 77 extends laterally from plate 70 to engage the underside of actuating lever 78. Actuating lever 78 carries actuating lug 80 and is pivotally mounted on the outer surface of side frame 26. Thus, the clockwise rotation of shaft 68 engages the plunger 76a of switch 76 with actuating lug 80.

Figure 3:
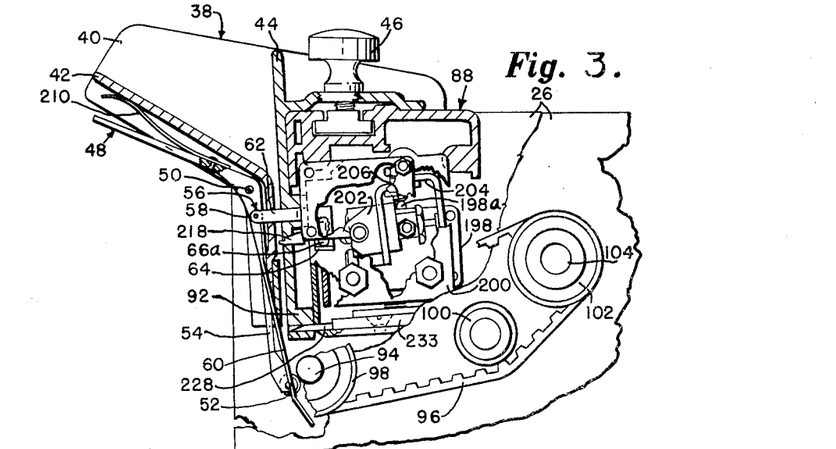
FIG. 3 is a sectional view of the front feed apparatus with parts broken away and showing the detail of the front feed apparatus structure and the arrangement of its parts.

FIG. 3 is a view of the front feed apparatus with a portion of upper side frame 26 removed to better illustrate the organization of the components of the sensing mechanism. A switch operator or lever 48 is pivotally mounted on side frame 26 on stud 50 and has retractable feed or idler roll 52 mounted on its downwardly extending arm 54 to form a part of the drive means for the front feed apparatus. Arm 54 of lever 48 further has a two armed lever 56 pivotally mounted thereon at stud 58. Downwardly extending operator or arm 60 of lever 56 has a rearwardly bent lower end portion below roll 52 which is normally in the path of a record passing through the guideway such that roll 52 is anterior to said end portion with respect to the direction of sheet feed. Rearwardly extending arm 62 of lever 56 is bent laterally outside the downward path of the document and has a laterally extending lug 64 engaging switch plunger 66a, the lever 48 thus being the operator for a control means or switch 66. It is the function of the form switch 66 to activate the perforation sensing mechanism responsive to the actuation of lever arm 60 by a document within the guideways. Numeral 198 indicates the electrical control means herein embodied as sensing switch 198. It is the function of switch 198 to energize brake solenoid 180 and stop the sheet drive mechanism responsive to the sensing of a perforation in the record. Sensing solenoid 202 is pivotally mounted on a suitable means or plate 200. Mounted on solenoid 202 and pivotally movable therewith is a switch actuating member 204 with a downward extending abutment 206 normally opposed to the plunger 198a of switch 198. The switch 198 is biased to closed position, but is normally held in open position by reason of plunger 198a being held depressed against abutment 206. The counterclockwise movement of sensing solenoid 202 about its pivotal mounting 210 is effective to release the plunger 198a as the abutment 206 moves away from the mounting plate 200 with the result that the switch is allowed to close. The forward end of an operator or sensing member 208 in the form of an arm is shown projecting into the guideway 38 and is provided to operate switch 198. The drive mechanism is shown with idler roll 52 in engagement with drive roll 94. Also shown is a biasing spring 210 which is effective to yieldingly bias the lever arm 54 of lever 48 counterclockwise so that idler roll 52 is maintained with a force toward drive roll 94 so that a record therebetween is held in frictional driving engagement to propel it downwardly in the guideway 38. FIG. 3 also shows the manner in which the control of the front feed apparatus over the document is relinquished contemporaneously with the closure of the carriage. The clockwise rocking of frame 88 as explained in connection with FIG. 1A causes the downward depending member 92 to engage lower arm 54 of lever 48 to disengage idler roll 52 from drive roll 94.

Figures 4, 5:
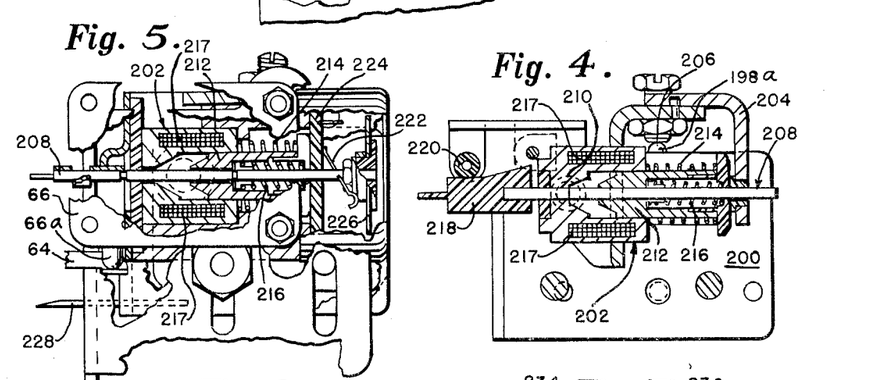
FIG. 4 is a detail drawing of one form of the sensing mechanism.
FIG. 5 is a detail drawing of an alternate embodiment of the sensing mechanism.

FIG. 4 shows the detail of the solenoid 202 and the sensing mechanism associated therewith. The solenoid 202 is pivotally mounted near its forward end on stud 210 fixed to plate 200. The solenoid includes an electrically operated member or tubular working core or plunger 212 which is movable leftwardly in the energized state of the solenoid 202. A compression spring 214 is provided to return the plunger to a right hand position in its unenergized condition. A slit spreading sensing member 208 is mounted along and slidably movable through and along the axis of plunger 212. A second compression spring 216 has one end abutting a flange on rod 208 and the other end abutting a flange on the outer end of the solenoid plunger 212 anchored at its forward end to a shoulder portion of plunger 212 and at its rearward end to member 208. The action of spring 216 is to provide a biasing force between the plunger 212 and sensing member 208 whereby the latter is urged with a constant but yieldable force against the broadside of a record in the energized state of solenoid 202.

Sensing member 208 is preferably formed of a material of a magnetically impermeable type so as to avoid a magnetic interaction between it and the winding 217 of the solenoid 202. The forward end of sensing member 208 has a cam portion 218. An abutment 220 is fixed to an extension of plate 200 in the path of travel of cam portion 218. As is apparent from the drawing, the movement of sensing member 208 leftwardly beyond a predetermined point will result in engagement of its cam portion 218 with abutment 220 to pivot the solenoid in a counterclockwise direction to release the plunger 198a of sensing switch 198 so as to allow the biased switch to close. Thus, the perforation sensing member 208 has been given the added function of sensing the passage of the trailing edge of a record.

FIG. 5 shows an alternate embodiment of the device shown in FIG. 4. Lug 64 carried by arm 62 of lever 56 is shown in its cooperative abutment with plunger 66a of form switch 66 in a position preparatory to the actuation of solenoid 202. The device of FIG. 5 has a solenoid 202 pivotally mounted and rockably responsive to engagement of the forward end of sensing member or arm 208 with an edge of a perforation in a record. Thus, in operation, the upper edge of a sheet perforation engages and pivots arm 208 in the same manner as the device of FIG. 4 to actuate sensing switch 198 to energize brake solenoid 180 to interrupt the drive to the front feed apparatus. It is with respect to the function of sensing the trailing edge of an unmarked record that the structure of the sensing mechanism has been changed. A switch mechanism is incorporated to function responsive to the longitudinal movement of sensing member 208 beyond a predetermined extent. For this purpose a fixed contact 222 is mounted on a bracket 224 proximate the rearward end of the solenoid 202. Contact 222 has the configuration of a forked member extending downward and on either side of the rear end of sensing member 208. Carried on sensing member 208 is a movable contact 226 movable forward into engagement with fixed contact 222 and operable to complete a circuit to energize brake solenoid 180 to inhibit the drive mechanism for the front feed apparatus. FIG. 5 also illustrates the position of the sensing member 208 relative to a record print line marker element or punch 228. It will be appreciated that an exaggerated scale is used in this figure. The record sheet is inserted bottom first in guideway 38. Therefore sensing member 208 serves to engage the perforation aligned with the last line previously printed. When the sheet is arrested in position and the carriage is closed, the activation of the punch 228 serves to perforate the record sheet on the line of the next line to be printed during operation of the bookkeeping machine.

Figure 6:
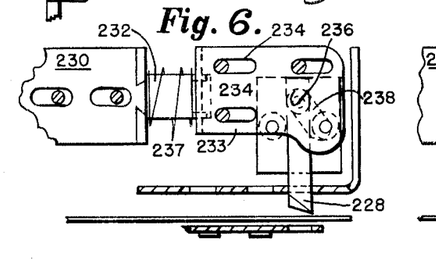
FIG. 6 is a view of the punch mechanism in its inactive or non-punching position.
Figure 7:
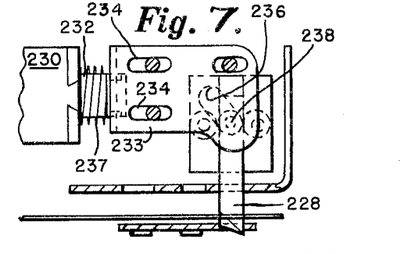
FIG. 7 is a view of the punch mechanism in its active or punching position.
Figure 12:
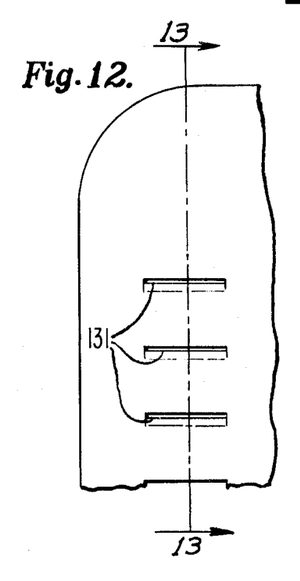
FIGS. 12 and 13 are fragmentary views of a record sheet.
Figure 13:
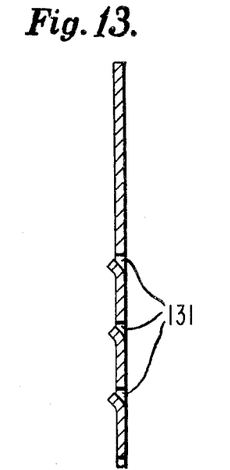

FIGS. 6 and 7 show the actuating mechanism for the punch. The punch is located adjacent to the guideway at a point spaced below the sensing member 208. The punch element 228 has a V-shaped cutting edge with a relief formed proximate the point. This configuration permits the cutting of a slit 231, FIGS. 12 and 13, which is somewhat spread open such that the upper edge 235 of the slit will catch on the forward end of the sensing member 208 in a subsequent sensing operation and pivot the sensing member. As the movable member 208 is biased to push against the sheet with a constant force, the spreadable slit will yield to the slit spreading portion on the forward end of the member preparatory to and assure operation of the pivotally mounted actuator 204, located oppositely of the slit spreading portion 218, for interruption of the sheet feeder and prevent mutilation of the sheet. Forward movement of the punch into the guideway is achieved by actuation of the punching solenoid 230. Coupled to the rearward end of the plunger 232 is a plate 233 having a plurality of elongated guide slots 234 for longitudinal movement thereof. An inclined slot 236 engages a stud 238 mounted on the rearward end of punch 228. Leftward movement of plate 233 and the action of slot 236 on stud 238 drives the punch 228 forwardly into the guideway to achieve a punch operation. A return spring 237 is provided to retract the punch subsequent to the deenergization of punching solenoid 230.

*Operation of sensing devices*

Figure 9:
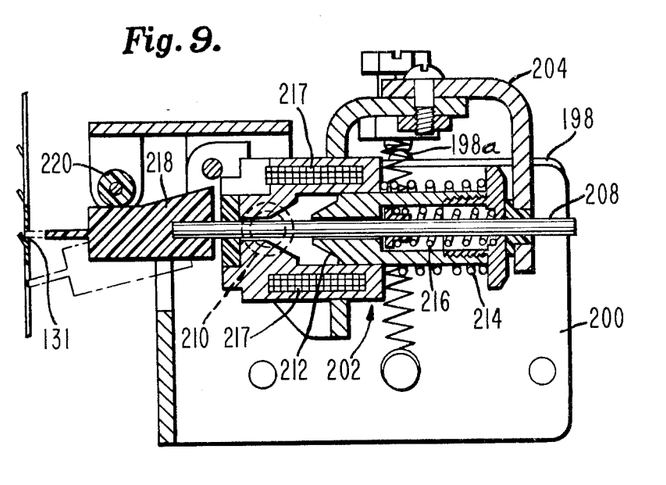
FIG. 9 is an enlarged sectional view similar to FIG. 4 with certain parts omitted to illustrate details of construction.

When a record sheet moving downwardly in the guideway, engages and pivots lever arm 60, the end 64 of the lever arm engages and closes the switch 56 which then completes the circuit of solenoid 202 (FIG. 9). The solenoid 202 is then energized and attracts the plunger 212 to move to the left, facing FIG. 9, until the plunger seats in its receiving socket in the solenoid. This movement of the plunger 212 compresses the return spring 214 and through spring 216 also moves the sensing member 208 to the left to sensing position. In this position, the left end of the sensing member is being held in contact with the opposed face of the document sheet by the spring 216. Also in the sensing position, the stop member on the sensing member 208 is held by the record sheet in spaced relation to the end wall in the plunger bore that receives spring 216 so that the sensing member 208 may have additional axial movement to the left relative to the plunger 212. During this time, the record sheet has been moving downwardly in the guideway, and let it be assumed that it is a new record sheet without line designating perforations. In this case, the sheet would proceed downwardly until the upper or trailing edge thereof passes the sheet contacting end of the sensing member 208 whereupon the sensing member would be axially moved leftward to its limit by the spring 216. When this occurs, the cam 218, carried by the sensing member 208, engages and rocks about the roller 220 which tilts the sensing member and solenoid about the pivot 210 in a counterclockwise direction, facing FIG. 9, whereupon switch button 198a is released to activate the switch and stop the sheet feed mechanism. This determines the position for making the first line designating perforation in the record sheet. When this sheet or any other record sheet having a line designating perforation is fed downwardly within the guideway the solenoid 202 will again be energized to move the sensing member to sensing position with sensing end in contact with the opposed face of the sheet. However, this time, the upper edge of the slit-like perforation will engage or catch on the end of the sensing member 208 and the latter will be pivoted thereby and release the switch button 198a to close the switch contacts. Thus, it will be seen that the sensing member 208 will respond either to the presence of the trailing edge of a record sheet and/or to the presence of a line designating perforation in a sheet. In either case, switch button 198a is closed to stop the sheet feed mechanism.

Figure 10:
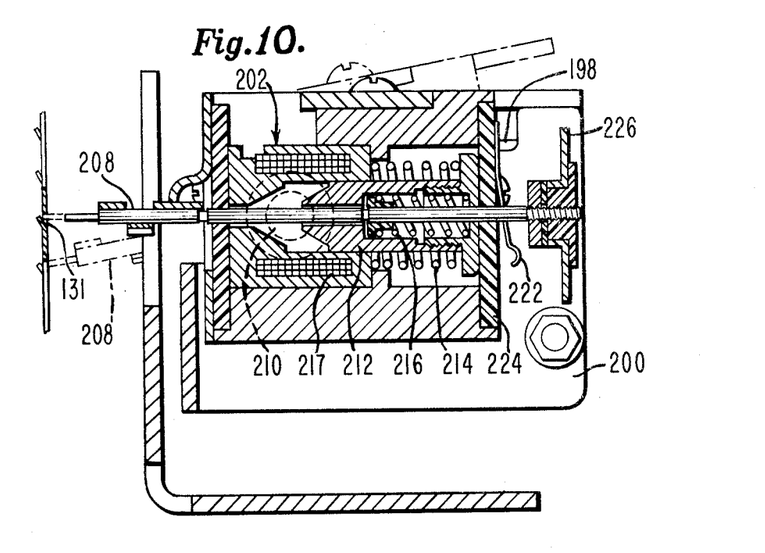
FIG. 10 is an enlarged sectional view similar to FIG. 5 with certain parts omitted to illustrate details of the modification.
Figure 11:
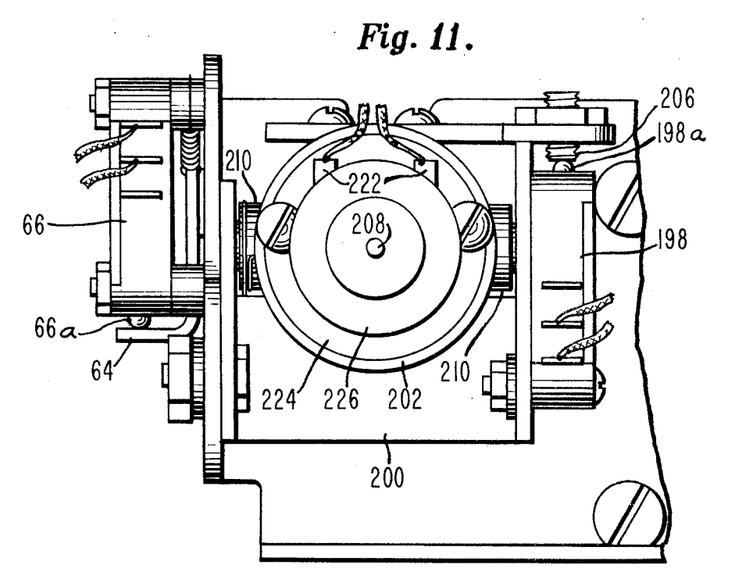
FIG. 11 is an end view of FIG. 5, looking from right to left thereof.

Referring now to the detail operation of the sensing device of FIG. 10, as before, when a record card fed downwardly in the guideway closes the contacts of switch 66, the solenoid 202 is energized and solenoid plunger 212 moves to the left to place the sensing member 208 in sensing position with the end thereof in sliding contact with the moving sheet. Assuming that the record sheet is a new sheet, that is one without any line designating perforations, the sheet will be fed downwardly in the guideway until the trailing edge of the sheet passes beyond the engaging end of the sensing member 208 whereupon the sensing member 208 will be moved further to the left by the spring 216 until the contact 226, carried by the sensing member, bridges the switch contacts 222. Upon the bridging of the contacts 222, the record sheet feed means is stopped which, as before, stops the sheet in proper predetermined position to receive its first line designating perforation. Subsequently, when this record sheet, or other sheet, having a line designating perforation is fed downwardly in the guideway, the upper edge of the perforation will catch on the end of the sensing member 208 and pivot the latter about pivot 210 to release switch button 198a. This closes the switch to stop the sheet feed means. Thus, it will be seen that in the modification of FIG. 10, the sensing member responds to the presence of the trailing edge of a sheet by moving axially to bridge contacts 222 and to the presence of a line designating perforation by tilting to release switch button 198a and that in either case the record sheet feed means is stopped.

FIG. 8 shows the electrical control system for the front feed apparatus. In the circuit diagram the various relay switches are not always shown as being physically grouped adjacent to the associated relay coil although in practice they are so located for common actuation by an armature in a manner well known in the art. An A.C. power supply is utilized to operate the bookkeeping machine and the front feed drive motor 176. A full-wave diode bridge rectifier 240 is used to provide a 115 volt D.C. power supply for the various relays and solenoids employed in the circuit except for the heavy duty punching solenoid 230 and brake solenoid 180 which are furnished with 150 volt D.C. Closure of on-off switch 76 by the rotation of shaft 68 conditions the front feed control circuit for operation and starts drive motor 176. Following the entry of a record into the guideway, the leading edge of the sheet pivots arm 60 which closes form switch 66 to energize sensing solenoid 202 and move the end of sensing member 208 into engagement with the form as it is being driven into the guideway. During the sensing operation, it is necessary to inhibit the power to the bookkeeping machine so that the motor relay 242 opens its contacts 242a in the line to the bookkeeping machine. When a perforation is sensed, sensing switch 198 is closed and brake solenoid 180 is energized to stop the drive to motor 176 in the manner shown in FIG. 2. With sensing switch 198 closed, current flows through the switch to energize relay 244 and brake solenoid 180. It is the purpose of relay 244 to indicate that a sensing of a perforation has occurred. Contacts 244b interrupt the current to motor relay 242 to close contacts 242a in the line to the bookkeeping machine. Contacts 244c open the line to sensing solenoid 202 because the sensing operation is completed and the sensing member is retracted from the guideway. Contacts 244d are closed to hold relay 244 energized so long as the form switch 66 remains closed and the record remains in the machine. Contacts 244e close preparatory to completing a circuit to motor relay 246. Contacts 244f and 244g are provided which are closed and opened in that order to transfer the current through resistor 250 to reduce the current through solenoid 180. If the lower limit switch 116 is employed in the system, the operation is the same as outlined above with reference to the action of relay 244. Since the lower limit switch 116 will be closed when the bottom leading edge of the record strikes it, the normally closed contact 244a is in its line to interrupt current through switch 116 after sensing is completed.

With the sensing operation complete, the bookkeeping carriage is closed to retain the sheet in its properly located position. Operation of the carriage open and close mechanism operates carriage open switch 146 and the carriage close switch 148 in the manner shown in FIG. 1. Switch 146 makes as soon as the carriage begins to close, but switch 148 does not make until the closing of the carriage is completed. When switch 146 is closed, current flows to motor relay 246 to open its contacts 246a and interrupt the power supply to motor 176 which is no longer required. Contacts 246b are closed and motor relay 245 holds motor 176 shut off until relay 244 drops out to open contacts 244e. With the carriage completely closed, the punching sequence must be initiated. Current passes through the carriage close switch 148 and the spacing switch 150 and 256b to energize relay 254. When relay 254 is energized, its contacts 254a are closed preparatory to energizing relay 256. When the carriage closes, switch 148 is transferred and when relay 256 is energized through 254a and 254b, its contacts 256a will be closed and the punching solenoid 230 will operate the punch 228 in the manner shown in FIGS. 6 and 7.

It is necessary to return the punch by deenergizing solenoid 230. This is accomplished by providing a contact 256b of relay 256 in the line to the relay 254. Thus, when the punch is made after energization of relay 256, the relay 254 is dropped out at the same time by opening of 256b. The 254a contact in the 256 line drops out and current is interrupted to solenoid 230 by opening of contacts 256a. The relay 254 is energized first, the relay 256 is energized as soon as the carriage closes, relay 256 then deenergizes relay 254 which then deenergizes 256, in that order and both are then deenergized.

It is also necesary to provide for a punch operation at the end of each spacing operation. This is provided by the transfer of the spacing switch 150 in the manner that cated in connection with FIG. 1. It should be noted that spacing is done always in a closed carriage situation so that carriage close switch 148 remains transferred to its dash line position. Transfer of spacing switch 150 energizes relay 254 and the spacing switch is then returned to the position indicated in the schematic to permit a punching operation in the manner hereinabove described. When the movable contact of switch 150 is transferred upwardly, the punching operation is set up and when it returns to normal, a punch is made so that the spacing operation is completed before the punch is actuated.

While the invention has been illustrated and described as incorporated in a preferred embodiment, it is not intended to be limited to the details shown, and various modifications and structural changes may be made without departing in any way from the spirit of the present invention.

What is claimed is:

1. A sensing device for sensing the trailing edge of a traveling record sheet or an edge of a perforation in a sheet respectively as indications of different line find designations comprising a supporting member, a solenoid including a movable tubular core pivotally mounted on said supporting member for pivotal movement from a normal position to a line find designating position, a sensing rod slidably mounted in said tubular core, a spring interposed between said core and said rod, said core on activation thereof rectilinearly movable and through said spring moving said rod to a sheet sensing position to position one end of said rod in contact with a face of a moving sheet, said rod engageable by an edge of a perforation in the sheet and tilted thereby to pivot said tubular core to the line find designating position, said rod rectilinearly movable beyond said sensing position by said spring upon the passing of the trailing edge of the sheet to another line designating position.

2. A sensing device for sensing either a perforation in a record sheet or the trailing edge of the sheet comprising, a supporting means, a pivotal member pivotal on said means from a normal position to a line find position, said member also slidably mounted for rectilinear movement on said means from an inactive to a sensing position, means operable to move said member to the sensing position, a sensing rod carried by said member with one end in engagement with the face of a moving record sheet when said member is moved to sensing position, said rod engaged by the edge of a sheet perforation to tilt the rod and pivot said member to the line designating position, said rod slidably movable beyond the face of the sheet upon the passing of the trailing edge of the sheet, cooperable cam means on said supporting means and said rod to pivot said member to the line designating position upon movement of said rod beyond the face of the sheet, and a spring interposed between said rod and said member operable to move said rod beyond the surface of the sheet to effect pivoting of said member by said cam means.

3. In a line spaceable record sheet printing machine provided with a sheet guideway and with a normally operating feeder to feed a sheet along the guideway, a device for sensing and stopping at the first printing line available on a sheet having a marking previously incised thereon in the form of a spreadable slit to indicate a line previous printing on the sheet inserted in the guideway, said device comprising a supporting means on the guideway, a member movably mounted on said supporting means and having a slit spreading projecting portion thereon extending through an opening in the guideway and biased toward the broadside of a sheet inserted past said member in said guideway, said member being activatable by and responsive to the presence of a sheet to push against the sheet with a constant force yielding to the opening of the slit first encountered by said member in the travel of the sheet thereby, and sheet feeder interrupting means including a sheet responsive actuator pivotally mounted on said supporting means opposite the slit spreading portion of said slit spreading member for movement with the further movement of the sheet subsequent to the spreading of the slit and while the slit spreading member is still in engagement with the sheet to interrupt the operation of the feeder and stop the sheet at a location corresponding to the next printing line on the sheet below the previous line of printing for which the aforesaid slit marking on the sheet was previously provided.

References Cited by the Examiner

UNITED STATES PATENTS

| 2,302,081 | 11/42 | Weitmann | 235—61.11 |
| 2,642,553 | 6/53 | Williams | 200—46 |
| 2,980,320 | 4/61 | Lapointe | 235—61.11 |

MALCOLM A. MORRISON, *Primary Examiner.*

WALTER W. BURNS, JR., *Examiner.*